March 19, 1957  G. W. CHEESEMAN  2,785,858
COUNTING MECHANISM FOR COUNTING A SUCCESSION
OF MOVING ARTICLES
Filed May 22, 1953  3 Sheets-Sheet 1

INVENTOR
George W. Cheeseman
Watson, Cole, Grindle & Watson
ATT'YS.

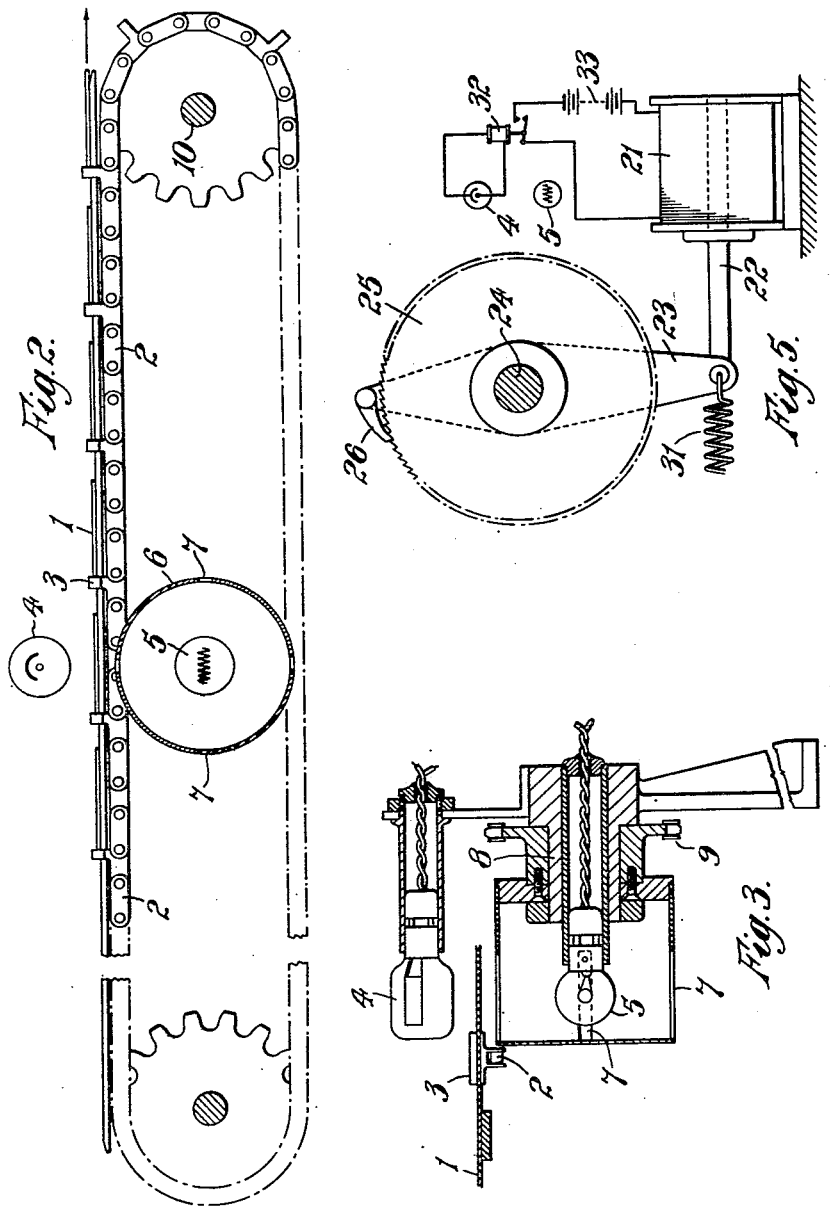

March 19, 1957 G. W. CHEESEMAN 2,785,858
COUNTING MECHANISM FOR COUNTING A SUCCESSION
OF MOVING ARTICLES
Filed May 22, 1953 3 Sheets-Sheet 3

INVENTOR
George W. Cheeseman
Watson, Cole, Grindle & Watson
ATTYS.

United States Patent Office 2,785,858
Patented Mar. 19, 1957

2,785,858

COUNTING MECHANISM FOR COUNTING A SUCCESSION OF MOVING ARTICLES

George William Cheeseman, Deptford, London, England, assignor to Molins Machine Company Limited, London, England, a British company Application May 22, 1953, Serial No. 356,680

Claims priority, application Great Britain May 27, 1952

3 Claims. (Cl. 235—98)

This invention concerns improvements in or relating to counting mechanism for counting a succession of moving articles, for example articles passing through a machine.

It is sometimes desirable to count or record the number of articles manufactured or operated upon by a machine, in such a way that as the articles are delivered from the machine they can easily be collected in numerically equal batches. Such counting is sometimes made more difficult because, due to misfeeds or some other cause, the number of articles actually delivered in a given time may be less than it would be if articles were delivered with perfect regularity at the normal rate of output of the machine.

According to the present invention there is provided counting mechanism for counting a succession of moving articles (for example articles passing through a machine) comprising a member movable in timed relationship with the means for moving said succession of articles, indicator means movable by said member, detector means to detect interruptions or gaps in the regular sequence of the succession of moving articles, and responsive to such interruptions to actuate means for varying or interrupting the movement of said indicator means by the said movable member, whereby the amount of movement of said indicator means corresponds to the actual number of articles passing said detector means.

Further according to the present invention there is provided counting mechanism for counting a succession of moving articles, (for example, articles passing through a machine) comprising means for moving articles, a driving member rotatable in timed relationship with the means for moving said articles and arranged to drive one sun gear wheel of a differential gear, a rotatable member driven by the other sun gear wheel of the said differential gear, detector means to detect interruptions or gaps in the regular sequence of the succession of moving articles, and responsive to such interruptions to actuate means for moving the planet carrier of said differential gear in a direction such as to cause the rotation of the said driven member to lag behind that of the said driving member by an angular amount proportional to the number of articles missing from said succession of articles as detected by the detector means, whereby the said driven member rotates by an angular amount which corresponds to the actual number of articles passing said detector means. The said driven member may be provided with a cam or the like adapted to operate an indicating device (such as a visible or audible signal) once on each revolution of the driven member.

The said detector means may comprise a photo-electric cell and a light source arranged one on each side of the path of said succession of articles so that light from said light source energises the photo-electric cell when a gap occurs due to an article missing from the regular sequence of articles. Where the articles are normally spaced apart, e. g. on a conveyor, there may be provided a rotatable shutter having one or more apertures each arranged in turn to register with and be closed by an article passing between the light source and the photo-electric cell.

The means to move the planet carrier may comprise a solenoid adapted to be actuated by the photo-electric cell when the latter is energised, and an operative connection (e. g. by a pawl and ratchet device) between said solenoid and said planet carrier whereby the latter is moved a predetermined angular distance on actuation of the solenoid.

Counting mechanism according to the invention will now be described by way of example with reference to the accompanying diagrammatic drawings (not to scale) in which:

Figure 2 is a sectional elevation of the conveyor shown in Figure 1, the view being taken on the line 2—2.

Figure 3 is a section of part of Figure 1 on the line 3—3.

Figure 5 is a side elevation of part of Figure 4 looking in the direction of the arrow B.

Figure 1:
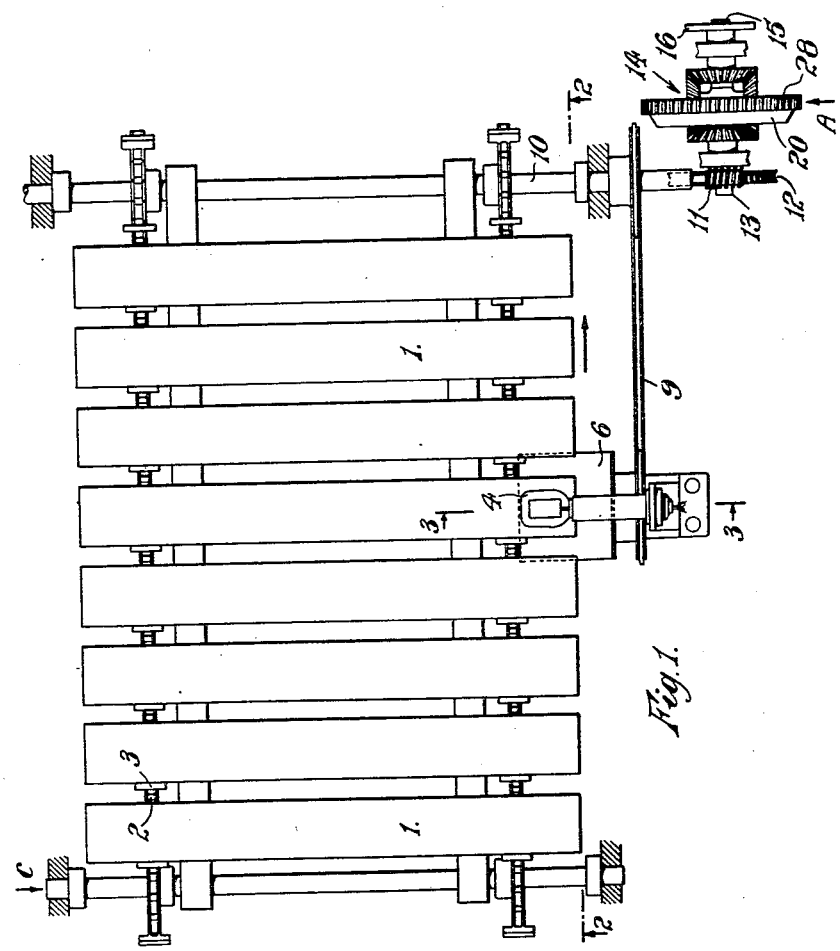
Figure 1 is a plan of a conveyor for cardboard tubes showing the invention applied thereto.
Figure 4:
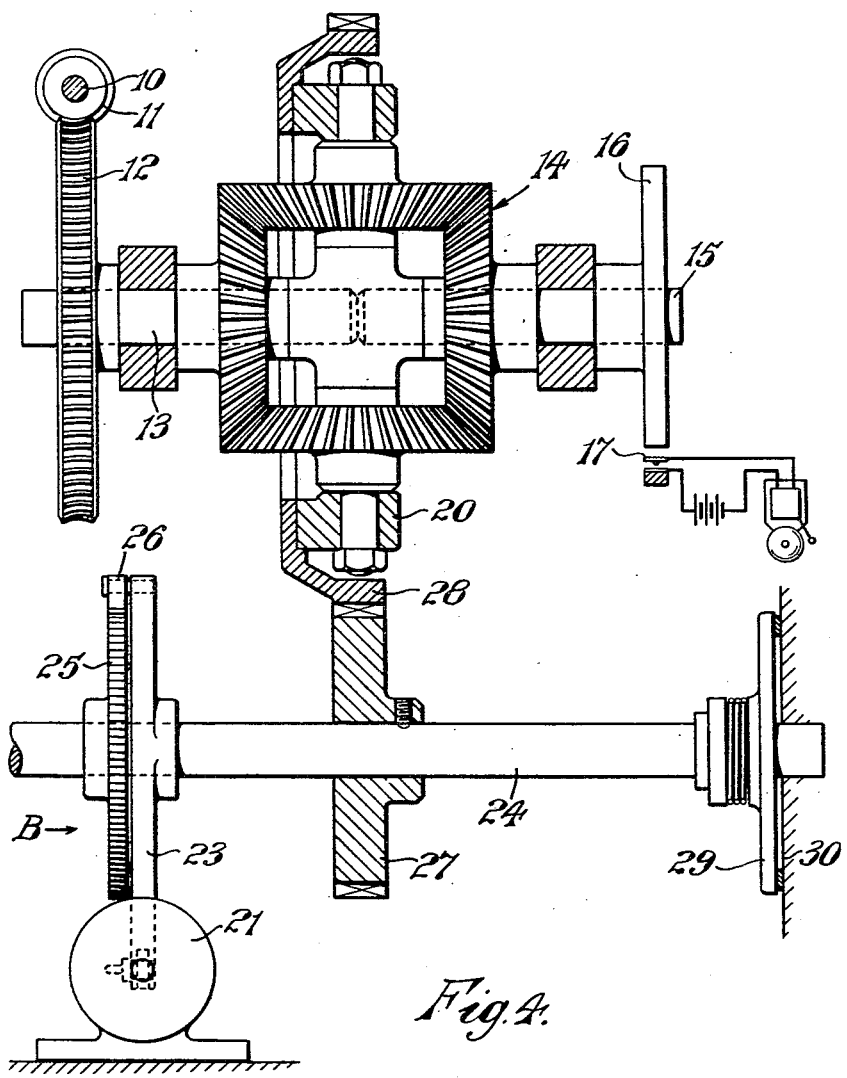
Figure 4 is a sectional elevation of part of Figure 1 looking in the direction of the arrow A.

Referring to the drawings the mechanism according to the invention is intended for use with a machine which manufactures paper or cardboard tubes each of which is to be divided into a number of shells or hulls for slide and shell cartons. The tubes 1 are formed in the machine from blanks, and are eventually delivered in a flattened condition to a position at which they are collected in batches each of a hundred tubes. They are delivered to this position by a conveyor 2 on to which they are moved in the direction of the arrow C Figure 1 and on which they are arranged so as to be moved forwardly in succession transversely of their length by pushers 3 on the conveyor engaging edges of the tubes.

During the manufacture of the tubes it sometimes happens that due to a misfeed or some other cause the normal regular sequence of blanks or of formed tubes passing through the machine is interrupted, and in such a case a gap occurs in the succession of tubes carried by the delivery conveyor 2, and the actual rate at which the tubes are delivered falls below the nominal rate. The counting mechanism about to be described provides a means for counting the tubes actually delivered, irrespective of any such interruptions of their normal sequence.

Above the delivery conveyor (which comprises two or more parallel chains across which the tubes are supported) is arranged a photo-electric cell 4, and an electric lamp 5 is located beneath the conveyor so as to be capable of directing a light beam through the conveyor into the cell. The lamp is enclosed in a rotatable shutter 6 consisting of a cylindrical casing with four apertures 7 equally spaced about its cylindrical surface, each aperture being capable of being brought in line with the lamp and the photo-electric cell to permit light to pass to the latter. The shutter is rotatable on a bearing 8 and driven by a chain 9 from a shaft 10 by which the conveyor is driven, and the apertures are so spaced apart that as the conveyor moves and the shutter rotates in timed relationship with the conveyor, each flattened tube on the conveyor registers in turn with an aperture in the shutter, and thus closes the aperture to prevent passage of light to the photo-electric cell. If however there is a tube missing from the conveyor, the aperture which would normally be closed by the missing tube remains open and light passes through it to the cell. Thus the arrangement constitutes detector means to detect interruptions or gaps in the regular sequence of the succession of tubes carried forwardly by the conveyor. Energising of the photo-electric cell actuates mechanism which will be described later.

The shaft 10 referred to above has fixed on it a worm 11 which engages a worm wheel 12 mounted on a further shaft 13 which for convenience will be referred to as the driving shaft. The gear ratio of the worm and wormwheel is 25:1, and since the shaft 10 makes one revolution for every four tubes carried past the detector device, the driving shaft 13 therefore makes one revolution for every 100 tubes. Thus if tubes were always conveyed in entirely unbroken succession, or in other words if there were no gaps in the sequence of tubes on the conveyor 2, the rotation of the driving shaft could be utilised as a counter, since each revolution of the shaft would represent 100 tubes delivered. As such gaps may in practice occur, provision is made, as will now be described, for taking such gaps into account, and subtracting missing tubes from the nominal total indicated by the rate of movement of the conveyor and of the driving shaft.

The driving shaft is coupled by a differential bevel gear 14 to a further shaft 15 (called for convenience the driven shaft) which therefore rotates at the same speed as but in the opposite direction to the driving shaft as long as the carrier 20 for the planet gears of the differential gear remains stationary.

The driven shaft has fixed on it a cam 16 which is arranged to operate a visual or audible signal of any desired kind once on each revolution of the shaft 15 so as to provide a means of indicating that a hundred tubes have been delivered. As shown the cam operates a switch 17 to close a circuit through a battery 18 and bell 19.

In order to vary or interrupt the movement of the driven shaft, and hence to control the operation of the indicating or counting means, the planet carrier 20 of the differential gear is arranged to be moved in correspondence with the detection of gaps in the sequence of tubes on the conveyor.

For this purpose a solenoid 21 is provided which is arranged to be actuated by the energising of the photo-electric cell 4 described above. The plunger 22 of the solenoid is connected to one end of a lever 23 which is freely pivoted on a shaft 24 on which is fixed a ratchet wheel 25 having 100 teeth. The other end of the lever carries a pivoted pawl 26 which engages the ratchet teeth. Retraction of the plunger, on actuation of the solenoid, swings the lever so as to cause the pawl to rotate the ratchet wheel by one tooth.

Fixed on the same shaft as the ratchet wheel is a gear wheel 27 which has 50 teeth and which meshes with a further gear wheel 28 of 100 teeth which is formed on the planet carrier of the differential gear. Thus actuation of the solenoid, which causes the ratchet wheel to be turned through one hundredth of a revolution, causes the planet carrier to be turned through half that angular distance, in such a direction as to cause the rotation of the driven shaft 15 to lag behind that of the driving shaft 13 by one-hundredth of a revolution. In this way detection of a gap in the sequence of tubes, equivalent to one missing tube, causes a corresponding reduction in the total angular distance turned by the driven shaft and the indicating cam 16, or in effect causes subtraction of one unit from the nominal total added up by the driving shaft. Thus while the driving shaft 13 makes one complete revolution, indicating that the conveyor has travelled a distance such as to deliver one hundred tubes if no tubes are missing from the conveyor, the driven shaft 15 rotates an angular amount which is less than a complete revolution by one-hundredth for each missing tube, and which therefore corresponds to the actual number of tubes delivered. Thus the indicating cam operates the signal only when one hundred tubes have actually been delivered.

The shaft 24 for the ratchet wheel 25 is suitably braked to prevent undesired movement and over-running, and also to prevent the ratchet being accidentally rotated in the wrong direction by withdrawal of the pawl. For this purpose one end of the shaft is provided with a spring-loaded friction plate 29 which co-operates with a suitable fixed surface 30.

The plunger of the solenoid is spring-urged by a spring 31 to retract the pawl lever 23 after each stroke as soon as the solenoid ceases to operate.

For simplicity of illustration it is assumed that the light cell 4 is of a type able to operate a moving coil relay to close a battery circuit and operate the solenoid. The elements are shown diagrammatically on Figure 5 where 32 is the relay whose contacts when closed connect a battery 33 to the solenoid 21.

In an alternative construction the ratchet wheel is mounted directly on the planet carrier, in which case it is provided with 200 teeth and the arrangement of the pawl lever is suitably modified, so as to provide that each stroke of the pawl rotates the ratchet wheel by half the angular distance through which it is desired to rotate the driven shaft and indicator cam, i. e. 1/200th part of revolution of ratchet wheel for one missing tube. The ratchet wheel in this case is suitably braked to limit its movement to that imparted to it by the pawl.

It will be appreciated that the usefulness of the device is not confined to the application described in the specific example given above. For example it could be used to operate recording mechanism for the purpose of recording the total output of a machine in a given time. In fact mechanism according to the invention could be usefully employed in connection with any mechanical operation in which articles are fed in a sequence which may be interrupted and in which it is desired to be able to count the actual numbers of articles fed.

What I claim as my invention and desire to secure by Letters Patent is:

1. Counting means for counting a succession of moving articles, comprising an endless conveyor for said articles on which they are spaced at a uniform pitch, a differential gear having one sunwheel coupled to said conveyor for movement in timed relationship therewith and driving the other sunwheel of the differential gear through the planet wheels of said gear, said other sunwheel being coupled to a rotary device whose amount of rotation by the drive through the aforesaid differential gear indicates the number of said pitches on the conveyor which have passed in a given time, a photo-electric detector for detecting the absence of an article from said succession, a planet carrier for said planet wheels and means for moving the planet carrier in response to impulses from said detector to rotate said other sunwheel in the opposite direction to that imparted thereto by the drive from the first said sunwheel of the differential gear whereby the position of the said rotary device indicates the total number of articles passing the detector in a given time.

2. Counting mechanism as claimed in claim 1 and wherein the articles are spaced apart on the means for moving a succession of articles comprising a rotatable shutter having one or more apertures each arranged in turn to register with and be closed by an article passing between the light source and the photo-electric cell.

3. Counting mechanism as claimed in claim 1 wherein the means to move the planet carrier comprises a solenoid adapted to be actuated by the photo-electric cell when the latter is energised, and an operative connection between said solenoid and said planet carrier whereby the latter is moved a predetermined angular distance on actuation of the solenoid.

References Cited in the file of this patent

UNITED STATES PATENTS

| | | |
|---|---|---|
| 1,105,396 | Behr | July 28, 1914 |
| 1,743,175 | Wensley et al. | Jan. 14, 1930 |
| 1,992,840 | Roesen | Feb. 26, 1935 |
| 2,261,655 | Lowe | Nov. 4, 1941 |

FOREIGN PATENTS

| | | |
|---|---|---|
| 339,018 | Great Britain | Dec. 4, 1910 |